United States Patent
Andre et al.

(10) Patent No.: US 7,008,008 B2
(45) Date of Patent: Mar. 7, 2006

(54) CROSS-MEMBER AT AUTOMOBILE FRONT

(75) Inventors: Gerald Andre, Amberieu en Bugey (FR); Hugues Cheron, Meximieux (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/781,927

(22) Filed: Feb. 18, 2004

(65) Prior Publication Data

US 2004/0222670 A1    Nov. 11, 2004

(30) Foreign Application Priority Data

Feb. 18, 2003  (FR) .................................. 03 01957

(51) Int. Cl.
*B62D 25/08*  (2006.01)
(52) U.S. Cl. ........................... 296/203.02; 296/193.09; 296/187.09
(58) Field of Classification Search ........... 296/203.02, 296/187.09, 193.09, 193.1, 203.01; 180/68.4, 180/66.4
See application file for complete search history.

(56) References Cited

U.S. PATENT DOCUMENTS

| | | | |
|---|---|---|---|
| 5,123,695 A * | 6/1992 | Kanemitsu et al. .... | 296/193.09 |
| 6,189,958 B1 | 2/2001 | Guyomard | |
| 6,216,810 B1 * | 4/2001 | Nakai et al. ................ | 180/68.4 |
| 6,273,496 B1 * | 8/2001 | Guyomard et al. .... | 296/193.09 |
| 6,357,821 B1 * | 3/2002 | Maj et al. .............. | 296/193.09 |
| 6,412,855 B1 * | 7/2002 | Cantineau et al. ..... | 296/187.01 |
| 6,547,317 B1 * | 4/2003 | Cheron et al. ......... | 296/193.01 |
| 6,619,419 B1 * | 9/2003 | Cheron et al. .............. | 180/311 |
| 6,634,702 B1 | 10/2003 | Pleschke | |
| 6,698,822 B1 * | 3/2004 | Adamski ................ | 296/203.02 |
| 6,715,573 B1 * | 4/2004 | Emori et al. ................ | 180/68.4 |
| 6,796,604 B1 * | 9/2004 | Igura et al. ............ | 296/193.03 |
| 6,814,400 B1 * | 11/2004 | Henderson et al. .... | 296/193.09 |
| 2003/0141745 A1 | 7/2003 | Henderson | |

FOREIGN PATENT DOCUMENTS

FR          2 796 031       3/2000
WO      WO 03/008256 A1    1/2003

* cited by examiner

*Primary Examiner*—Greg Blankenship
(74) *Attorney, Agent, or Firm*—James R. Williams

(57) ABSTRACT

The invention relates to an equipment front face for a motor vehicle, the front face comprising a top cross-member extended at its ends firstly by lateral supports and secondly by legs. Said front face includes at least first and second structural parts each having a central portion and two extensions on either side of said central portion, the central portions of the two structural parts belonging to the cross-member, the extensions of the first structural part belonging to the lateral supports, while the extensions of the second structural part belong to the legs. The top cross-member includes a body made of a plastics material interconnecting the structural parts.

19 Claims, 6 Drawing Sheets

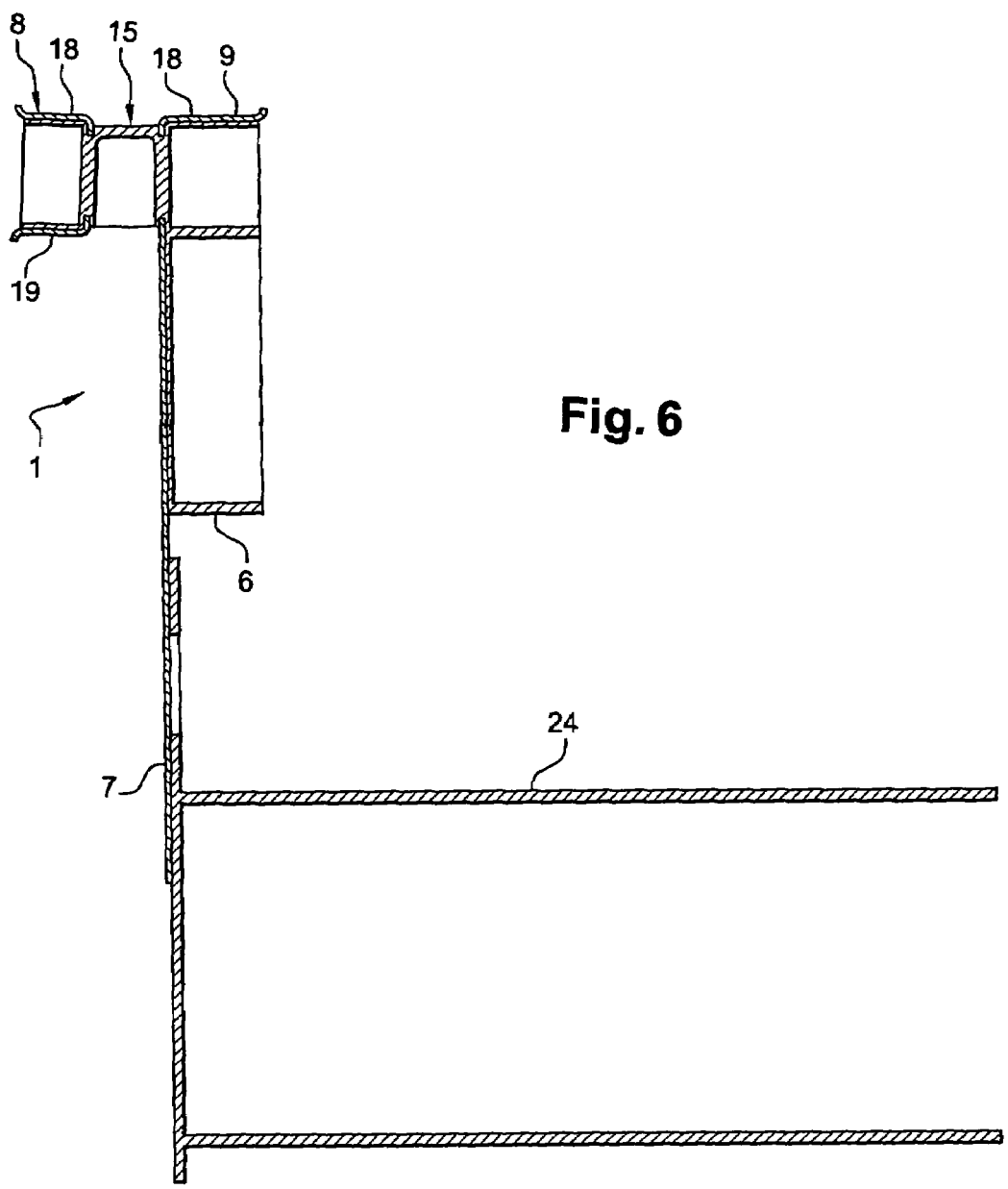

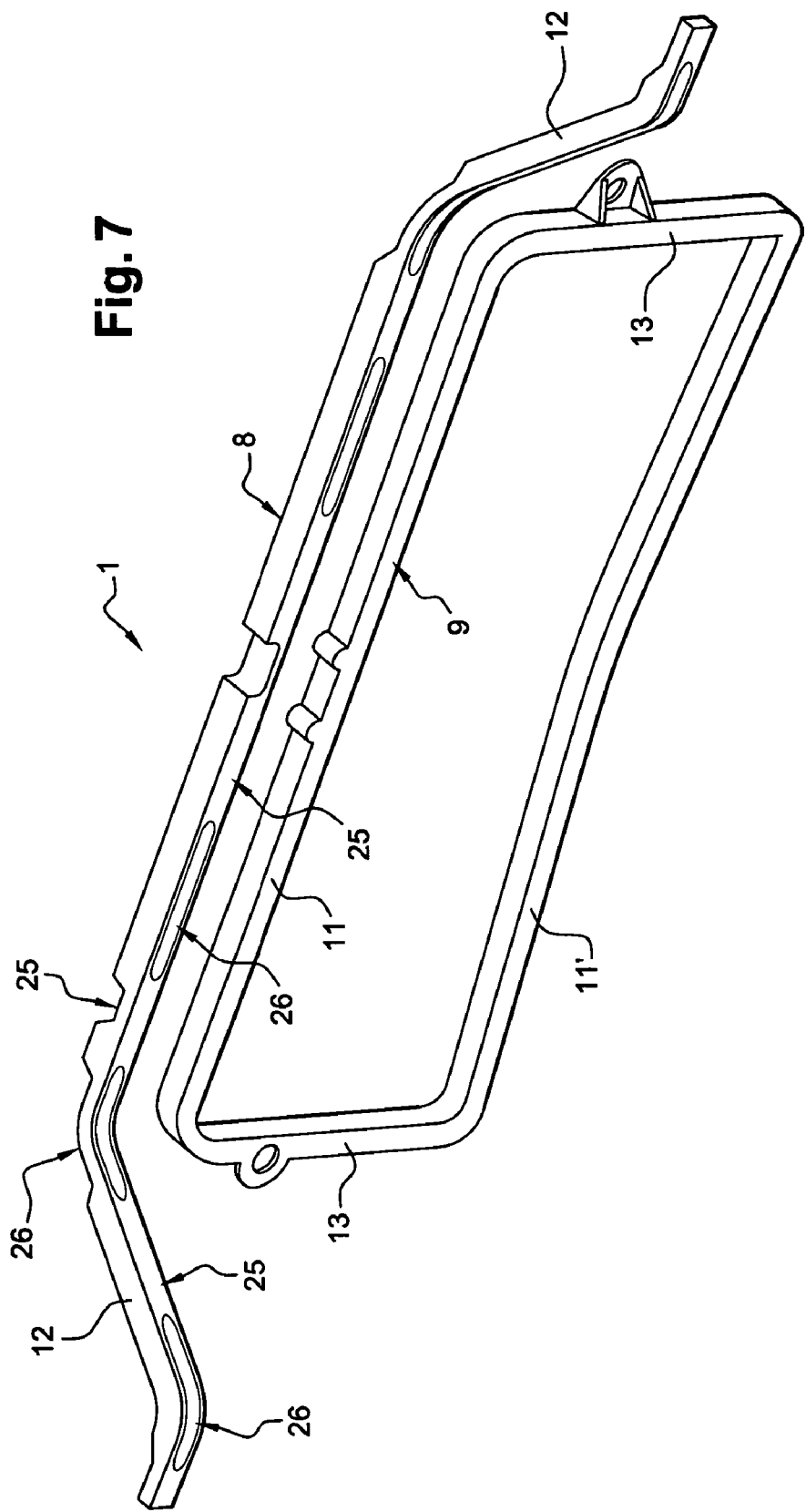

CROSS-MEMBER AT AUTOMOBILE FRONT

The present invention relates to a stiffened equipment module for a motor vehicle. Such a module is often referred to as the "equipment front face" of a motor vehicle.

BACKGROUND OF THE INVENTION

As a general rule, an equipment front face includes a top cross-member for interfacing with a hood which is secured thereto by means of at least one lock housed in the cross-member.

The top cross-member performs several functions:
- firstly it must prevent the hood from opening in undesired manner, whether when forced as a result of vandalism, or accidentally under the effect of suction applied to the hood while the vehicle is running or following a front impact;
- secondly it must enable the hood to be slammed shut, i.e. it must enable it to be closed after dropping through several tens of centimeters;
- thirdly it contributes to stiffening the body of the vehicle since it provides a transverse connection between its fenders; and
- fourthly, in some cases, it must be capable of supporting functional members of the vehicle, such as a radiator.

In order to perform these functions, the cross-member must be sufficiently stiff. In particular it must present good bending strength, and also (although to a lesser extent) good twisting strength.

Such a cross-member is extended at its ends:
- firstly by lateral supports, onto which various functional members of the vehicle are generally fixed, such as headlights, and whereby the cross-member is connected to a fender skirt or to an upper side rail; and
- secondly by legs which connect the top cross-member to bottom plates for fixing the front faces of the side rails, and on which a bumper beam is generally fixed.

The plates form the main anchor points of the equipment front face, while the ends of the side supports form secondary anchor points. It is therefore preferable for the legs and the side supports also to present good stiffness, and in particular good bending strength.

Equipment front faces are known that are made essentially out of metal.

Although such front faces are quite good at withstanding the bending stresses that result from traction exerted on the hood in order to force it open, they are nevertheless complicated to manufacture, since manufacture requires numerous operations, in particular cutting-out operations, stamping operations, and welding operations which are complex and require large and expensive tooling. In addition, such front faces are relatively heavy. However, car manufacturers are seeking on the contrary to lighten the structural parts of vehicles.

Other types of equipment front face also exist that are made essentially out of plastics material.

Such front faces are more convenient to manufacture, since injecting plastics material is by its very nature more flexible than is shaping metals.

Nevertheless, those plastics materials that have the highest performance (specifically in terms of bending strength) are also the most expensive.

In addition, for given strength, a part made of plastics material is generally bulkier than a part made of metal.

Although manufacturers are seeking lightness as mentioned above, they are also seeking compactness.

OBJECTS AND SUMMARY OF THE INVENTION

The invention seeks in particular to solve the above-mentioned drawbacks of prior art equipment front faces by proposing an equipment front face which is both compact and lightweight, which presents at least as much resistance to traction exerted on the hood as is presented by prior art front faces, and which is both convenient and inexpensive to manufacture.

To this end, the invention provides an equipment front face for a motor vehicle, the front face comprising a top cross-member extended at its ends firstly by lateral supports and secondly by legs, said front face comprising at least first and second structural parts each having a central portion and two extensions on either side of the central portion, the central portions of the two structural parts belonging to the cross-member, the extensions of the first structural part belonging to the lateral supports while the extensions of the second structural part belong to the legs, and wherein the top cross-member includes a body made of a plastics material interconnecting the structural parts.

By associating the structural parts in their central portions, the cross-member is given good strength, both in bending and in twisting, which is also encouraged by the disposition of the extensions of the structural parts.

The structural parts are preferably metal parts.

In an embodiment, the cross-member body includes stiffening means suitable for keeping constant the cross-section of the structural parts.

This provides the front face with better strength in bending, and also in twisting.

These stiffening means comprise, for example, an grid of transverse ribs extending in the space defined by each structural part.

In addition, the structural parts are engaged on the body of the cross-member, for example.

In a variant, the structural parts are at least partially embedded in the body of the cross-member.

The second structural part advantageously presents a general profile in the form of an upside-down U-shape so as to contribute to stiffening legs of the equipment front face.

In an embodiment, each of the structural parts is of C-shaped section; they may be oriented in such a manner that the concave sides of their respective central portions face towards each other, thereby presenting advantages in terms of twisting strength, or on the contrary they can face away from each other.

In this configuration, one of the structural parts is provided, for example, with a projecting finger suitable for being received in a facing cavity formed in the other structural part.

By way of example, one of the structural parts is situated towards the front of the cross-member, while the other is situated towards the rear thereof.

In another embodiment, the structural parts are in the form of metal plates that are positioned, in section, at the extreme bottom and top limits of the cross-member body, itself made of thermoplastic and interposed between them.

The vertically-superposed structural parts and the cross-member body thus together form a sheetmetal-plastic-sheet-metal sandwich, and tests have shown such that a combination provides optimum stiffness in bending for the top cross-member.

By way of example, one of the structural parts presents an overall profile that is closed.

BRIEF DESCRIPTION OF THE DRAWINGS

The invention will be better understood on reading the following description given purely by way of example and made with reference to the accompanying drawings, in which:

FIG. 6 is a view analogous to FIG. 5, showing the two structural parts departing from the parallel; and FIG. 7 is a fragmentary view in perspective as seen from behind of an equipment front face in a third embodiment.

MORE DETAILED DESCRIPTION

Figure 1:
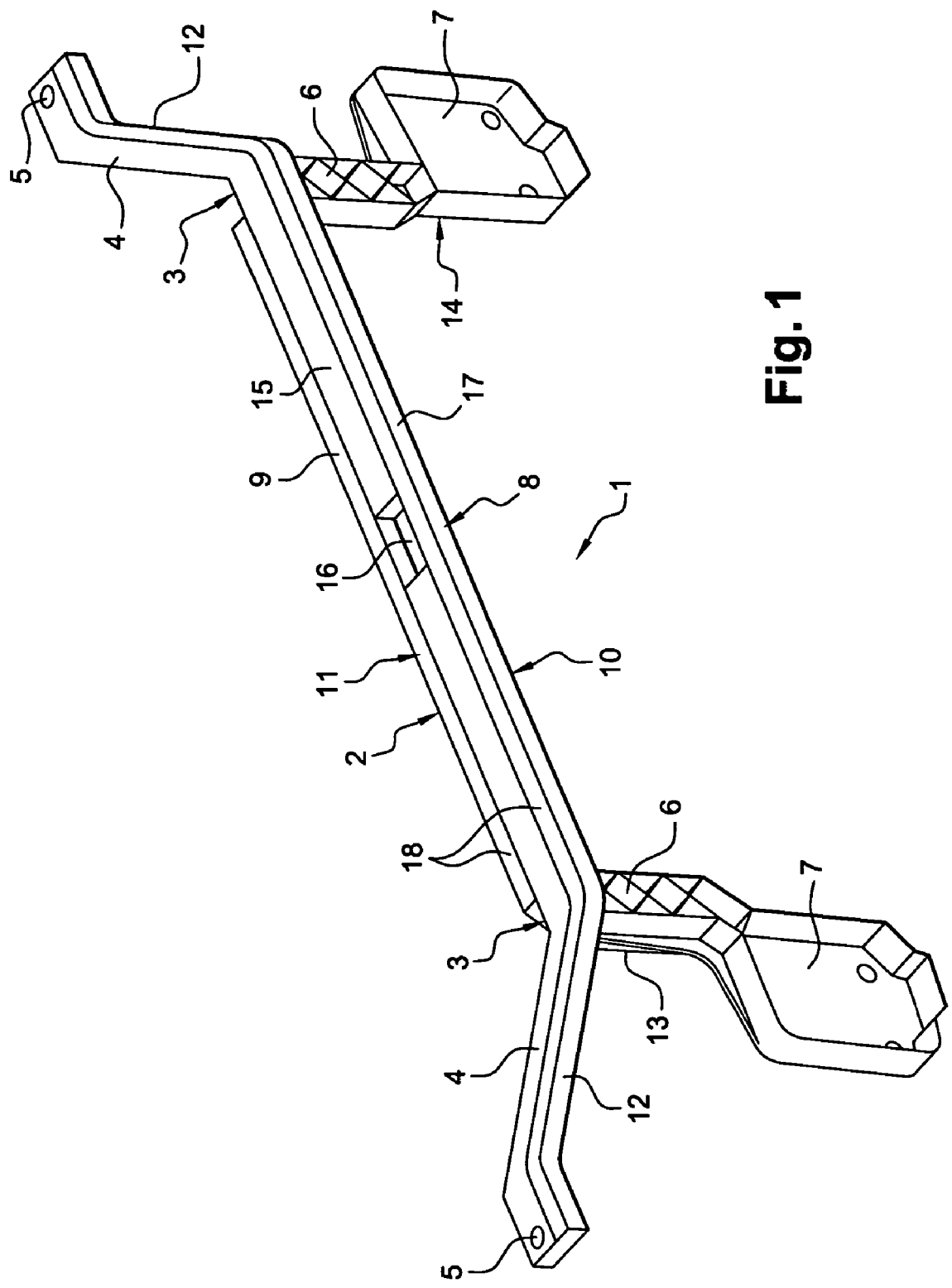
FIG. 1 is an exploded perspective view seen from in front of an equipment front face constituting a first embodiment of the invention, in which the structural parts have their concave sides facing towards each other.

FIG. 1 shows an equipment front face 1 of a motor vehicle which, for securing the hood (not shown) of the vehicle, comprises a top cross-member 2 which extends transversely relative to the general travel direction of the vehicle.

The cross-member 2 is extended on either side, at each of its ends 3 by lateral supports 4 each of which is fixed to a fender skirt, or in certain types of motor vehicle, to an upper side rail on which the fender of the vehicle is generally mounted.

For this purpose, and as can be seen in FIG. 1, each lateral support 4 is pierced at its end by a hole 5 for passing a screw for fixing the fender skirt or the side rail, or a peg for defining position relative to the fender skirt or the side rail.

As can be seen in the figures, the top cross-member 2 is generally straight, while the lateral supports 4 do not extend exactly in line therewith.

Specifically, the lateral supports are offset rearwards and/or upwards from the cross-member 2, with this shape depending above all on the structure of the surrounding structural parts (engine, fender skirts, side rails, etc.), but also on the shape of functional members, in particular headlights (not shown) which are mounted on the lateral supports 4.

The cross-member 2 is also extended on either side, at its ends 3, by legs 6 extending substantially vertically which connect it to plates 7 which are fixed to the front ends of side rails (not shown).

Although not shown either, it should be specified that a bumper beam is designed to be mounted on the plates 7 via localized energy absorbers (not shown) mounted thereon, with the bumper beam being fixed in turn thereon.

The front face 2 includes at least two structural parts 8, 9, namely a first structural part 8 and a second structural part 9, each having a central portion 10, 11, and two extensions 12, 13 on either side of the central portion 10, 11.

The first structural part 8 situated at the front of the cross-member 2 is referred to as the front part, while the second structural part 9 situated behind the cross-member 2 is referred to as the rear part.

The central portions 10, 11 of the two structural parts 8 and 9 belong firstly to the cross-member 2. Secondly, the extensions 12 of one of the structural parts (specifically the front part 8) belong to the lateral supports 4, while the extensions 13 of the other structural part (specifically the rear part 9) belong to the legs 6.

Thus, the central portions 10, 11 of the structural parts 8, 9 extend substantially horizontally, while the extensions 12 of the front structural part 8 extend in a direction that slopes rearwards and/or upwards, and the extensions 13 of the rear structural part 9 extend vertically.

As can be seen in FIG. 1, the equipment front face 2 in fact comprises a carcass 14 made by molding a plastics material (preferably a thermoplastic such as polypropylene) which forms at least part of the top cross-member 2, the side supports 4, and the legs 6.

More particularly, the cross-member 2 includes a body 15 which connects together the structural parts 8 and 9 that serve to reinforce the cross-member 2, at least with respect to bending strength, where bending stresses appear in particular when traction is exerted on the hood, which is secured to the cross-member 2, e.g. by means of a lock (not shown) placed in a housing 16 formed in the cross-member body 15.

For reasons of convenience, the structural parts 8 and 9 are referred to as "reinforcements" in the description below.

These reinforcements 8 and 9 are specifically metal section members each having a web 17 that extends in a vertical plane when the reinforcements 8, 9 is mounted on the carcass 14, and is itself extended by two flanges 18, 19 formed by rims extending at right angles in parallel horizontal planes in the central portions 10, 11 of the reinforcements 8, 9.

The reinforcements 8, 9 thus present, in cross-section (i.e. for their central portions 10, 11 in a plane perpendicular to the cross-member body 15) a channel-section of C-shape (i.e. where the width of the web 17 is greater than or equal to the width of the flanges 18, 19).

Figure 2:
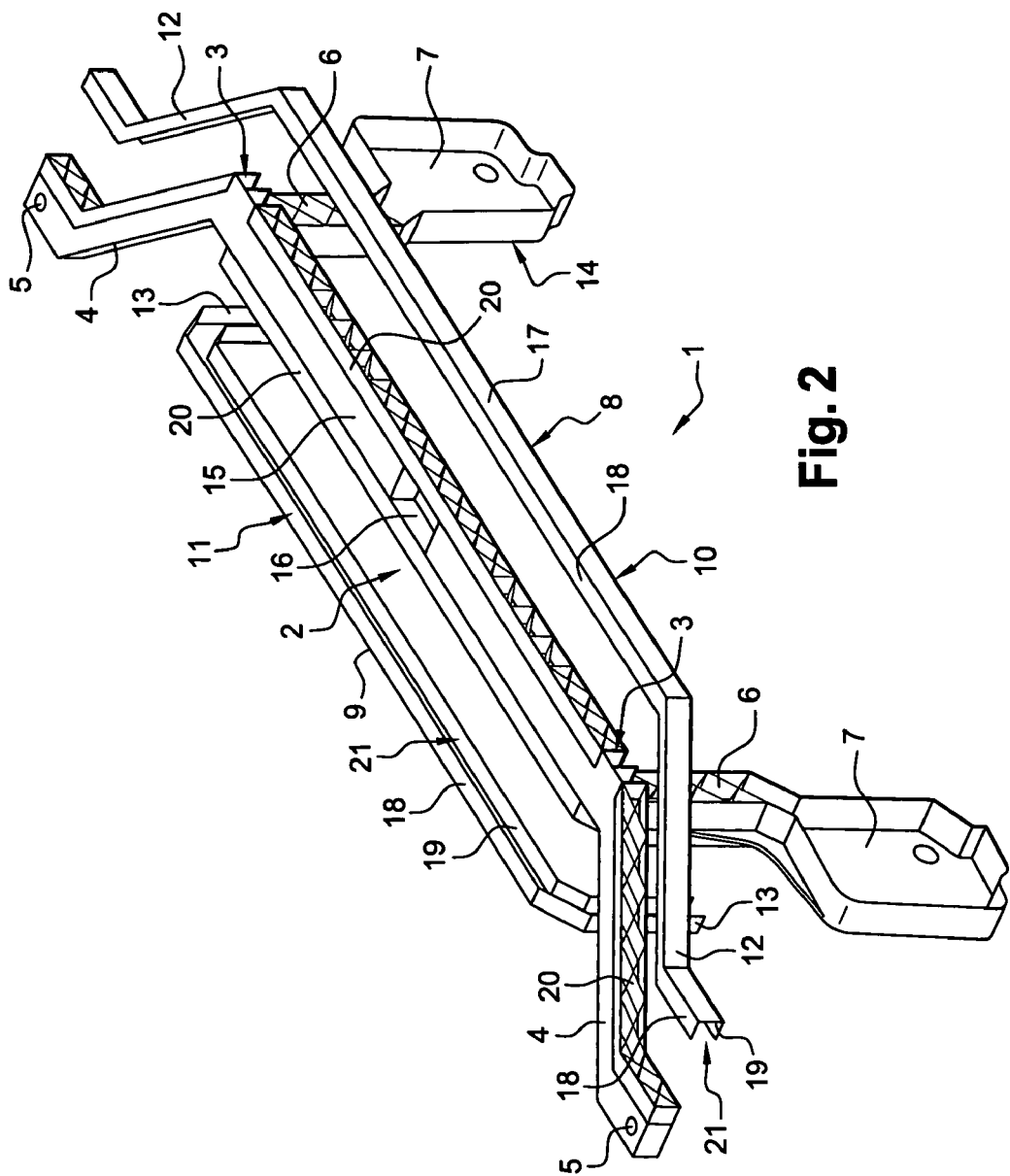
FIG. 2 is a perspective view of the equipment front face of FIG. 1 after it has been assembled.

In a first embodiment shown in FIGS. 1 and 2, the reinforcements 8 and 9 are fitted on the carcass 14 being engaged thereon in such a manner that the concave sides of the reinforcements 8 and 9 face each other in their respective central portions 10 and 11.

To be more precise:

the central portions 10, 11 of the reinforcements 8, 9 are engaged on the body 15 of the cross-member;

the extensions 12 of the front reinforcements 8 are engaged on the lateral supports 4; and the extensions 13 of the rear reinforcement 9 are engaged on the legs 9.

Once this particularly simple and quick assembly has been performed, the front reinforcement 8 presents a generally C-shaped profile with its concave side facing rearwards and/or upwards while the rear reinforcement 9 presents a generally C-shaped profile with its concave side facing downwards.

It will be understood that the stiffness of the cross-member 2, i.e. its bending strength, lies essentially in the presence of the reinforcements 8, 9.

Under the effect of traction being exerted on the hood, the cross-member 2 is subjected to bending stress directed vertically upwards. In other words, this stress is normal to the flanges 18, 19 of the reinforcements 8, 9 in their central portions 10, 11.

Under the effect of this stress, the reinforcements 8, 9 tend to deflect, curving upwards. Their ability to withstand this overall deformation increases with their increasing ability to withstand local deformation.

That is why the second moment of area (i.e. in practice the shape) of the cross-section of the reinforcements 8, 9 should be maintained substantially constant.

For this purpose, the cross-member 2 in this case has stiffening means for keeping the cross-section of the reinforcements 8, 9 constant or substantially constant.

Specifically, these stiffening means comprise an grid of transverse ribs 20 formed on the cross-member body 15, and extending therealong.

As can be seen in the figures, the grid of ribs 20 is complementary in shape to the reinforcements 8, 9 so that when the reinforcements are engaged on the cross-member 2, the grid 20 occupies the space 21 defined by the web 17 and the flanges 18, 19 of each reinforcement 8, 9.

The grid of ribs 20 enables to keep the spacing between the flanges 18, 19 of a given reinforcement 8, 9 constant so as to ensure that it is not very sensitive to local deformation. As a result the second moment of area of the reinforcements 8, 9, and consequently of the top cross-member 2, is maintained substantially constant, thereby increasing its stiffness and its bending strength.

As can be seen in FIG. 1, the grid of ribs 20 is extended over the lateral supports 4 and also over the legs 6. The second moment of area of the reinforcements 8, 9 is thus conserved in those portions also, thereby contributing to the stiffness of the equipment front face 1 in the lateral supports 4 and the legs 6;

Since the lateral supports 4 and the legs 6 are parts for connecting the cross-member 2 to the structure of the vehicle, as explained above, this increased stiffness of the lateral supports 4 and of the legs 6 further increases the strength of the cross-member 2 in bending, and more generally increases the overall stiffness of the front face 1.

In the embodiment described above, the reinforcements 8, 9 are fitted onto the cross-member body 15.

In a variant, the reinforcements 8, 9 may be embedded at least in part in the cross-member body 15. Similarly, their extensions 12, 13 may be embedded at least in part respectively in the lateral supports 4 and in the legs 6. This disposition can be obtained in relatively simple manner by overmolding.

Figure 5:
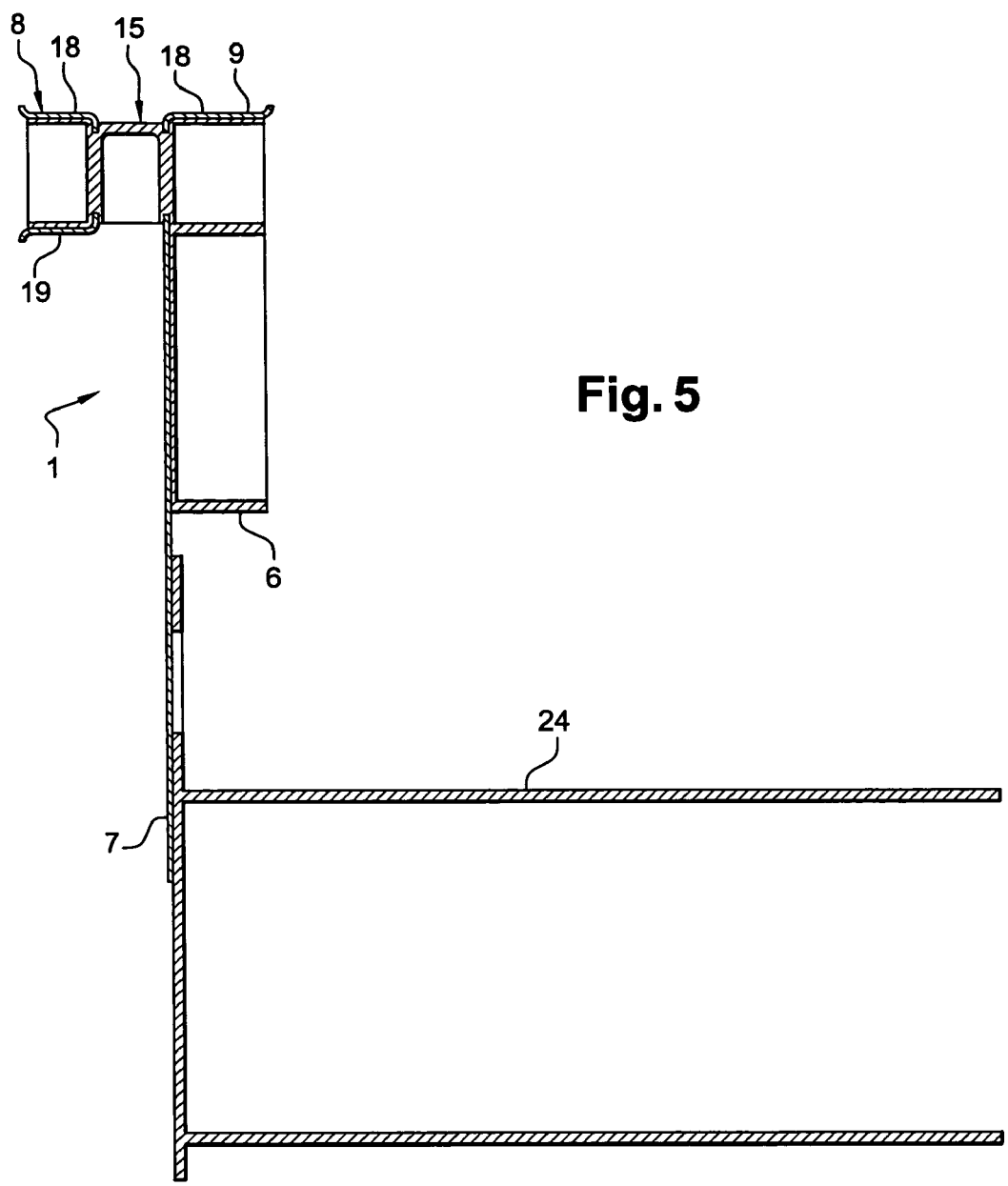
FIG. 5 is a longitudinal elevation view in section showing a front face in which one of the structural parts is connected to a side rail of the vehicle, with the two structural parts being kept parallel.

Under such circumstances, it is possible in particular to place the reinforcements 8, 9 in such a manner that their concave sides in their central portions 10, 11 do not face towards each other, but instead face away from each other, as shown in FIGS. 5 and 6.

A second embodiment of the invention is described below with reference to FIGS. 3 and 4.

In this embodiment, the reinforcements are specifically disposed in such a manner that their concave sides in their central portions 10 and 11 face away from each other.

Elements that are common to the first embodiment as described above are not described again. However, such elements are given the same numeral references in the figures.

Figure 3:
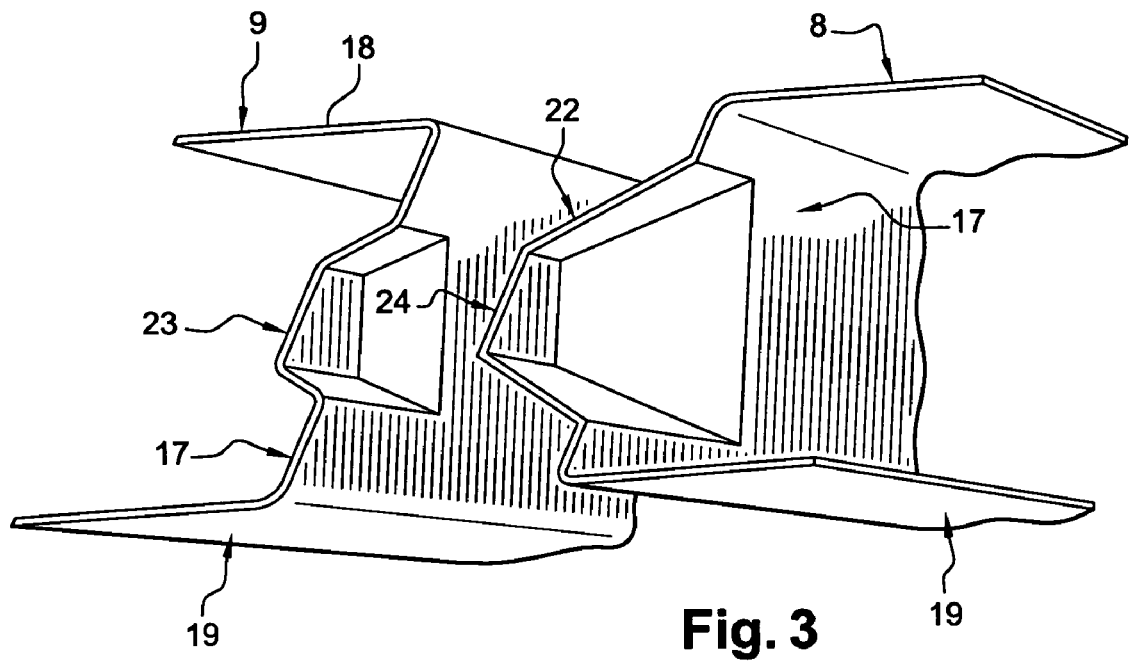
FIG. 3 is a detail view in perspective showing two structural parts with their concave sides facing away from each other, in a position of normal use in which these parts are spaced apart from each other.
Figure 4:
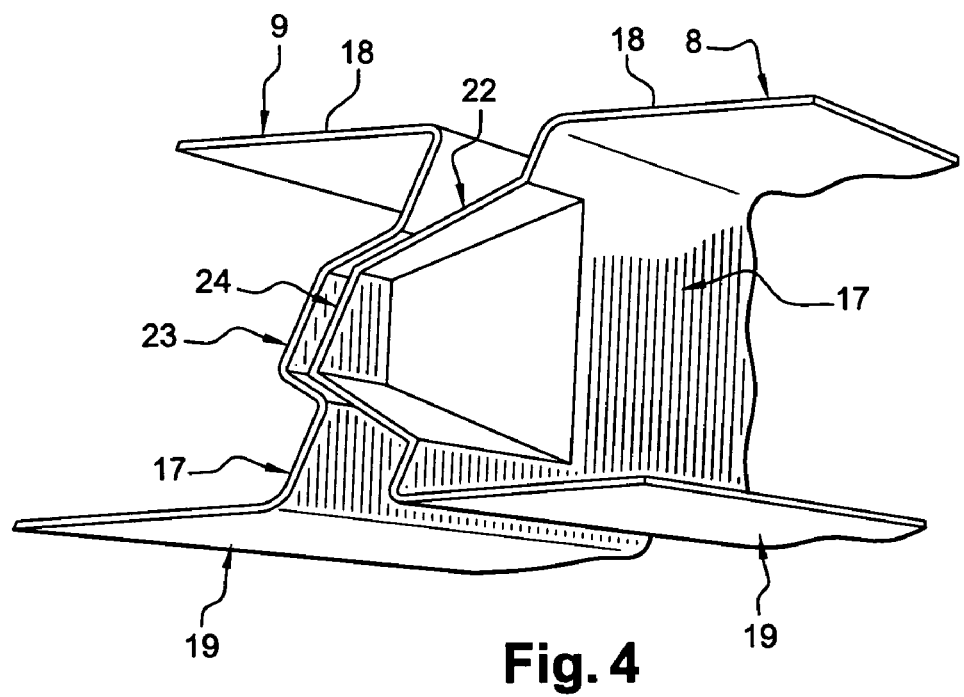
FIG. 4 is a view analogous to FIG. 3 showing a configuration in which the structural parts are close to each other, e.g. following a front impact.

In FIGS. 3 and 4, only the reinforcements 8 and 9 are shown for reasons of clarity.

As can be seen in each of these figures, the front reinforcement 8 presents a finger 22 projecting rearwards from its web 17 in its central portion 10, i.e. projecting away from its concave side. This finger 22 can easily be obtained by stamping.

The rear reinforcement 9 has a central portion 10 which presents a cavity 23 hollowed out in the concave side of the reinforcement 9 in register with the finger 22. This cavity 23 forms a housing for the end 24 of the finger 22, and it is complementary in shape thereto.

On assembly, the reinforcements 8 and 9 are positioned on the cross-member body 15 so as to be spaced far enough apart from each other for the finger 22 to be at a distance from the cavity 23, as shown in FIG. 3.

In this configuration, the reinforcements 8 and 9 are not in contact with each other, and any bending or twisting stresses to which they are subjected are communicated to the cross-member body 15, which acts as a damper.

In the event of a front impact involving the front reinforcement 8, it is moved rearwards, flattening the cross-member body 15 until it comes into abutment against the rear reinforcement 9, with the finger 22 being received in the cavity 23.

The impact is then transmitted to the rear reinforcement 9 which opposes the force thereof by means of its own bending strength (and/or twisting strength, where appropriate). This strength is added to and combined with the strength of the front reinforcement 8, thereby increasing the overall stiffness of the front face 1 both in bending and in twisting.

In spite of its stiffness in a critical situation in which it is under stress (e.g. during a front or a side impact, or when a front wheel strikes an obstacle), the front face 1 presents a certain amount of flexibility when at rest (i.e. not in critical situations), made possible by the relative independence of the reinforcements 8, 9.

This flexibility is illustrated by FIGS. 5 and 6 which relate to the second above-described embodiment in which the reinforcements are located back to back, but which could equally well be applied to the first embodiment described above.

As can be seen in FIG. 5, the plates 7 are fixed to the side rail 24 of a vehicle. The rear reinforcement 9 is thus connected in rigid manner to the side rail 24.

As explained above, the front reinforcement 8 is connected in rigid manner to the fenders of the vehicle (even though this cannot be seen in the figure), either via an upper side rail (not shown), or via a fender skirt.

The fixing of the reinforcements 8 and 9 defines their positioning. When the fender skirt (or the upper side rails as the case may be) and the side rails 24 are properly positioned to one another, the reinforcements 8 and 9 automatically come into alignment with each other, as shown in FIG. 5.

However, when the side rail 24 is not in alignment with the fender of the vehicle, as shown in FIG. 6 (and as can be accepted within vehicle assembly tolerances), the flexibility of the front face 1 enables assembly to take place without it being necessary to deform at least the front reinforcement 8.

This makes it possible to conserve good geometrical positioning, at least for the front reinforcement 8.

It should be observed in FIG. 6 that the lack of parallelism is exaggerated in order to illustrate the relative flexibility of the front face 1.

In the embodiment shown in FIGS. 5 and 6, the reinforcements 8 and 9 are integrated in the cross-member body 15 by overmolding.

Under such circumstances, it is preferable to embed the flanges 18 and 19 at least in part in the cross-member bogy 15 so that in the event of the front face being subjected to deformation, the force transmitted by the cross-member body 15 is shared between the reinforcements 8 and 9.

As mentioned above, the cross-member body presents a grid of ribs which, were they to press directly against the flanges 18 and 19, would lead to stresses being localized in manner that would be damaging for the mechanical properties of the reinforcements 8 and 9.

A result of this particular form of overmolding is to minimize the risks of stresses becoming localized in the event of deformation, and consequently is to stabilize the front face 1 mechanically.

Furthermore, although the flanges 18 and 19 are shown as being parallel, it is possible to open up the section of the reinforcements 8, 9 so that the flanges 18, 19 are splayed apart from each other (at least to a small extent), thereby increasing the second moment of area of the reinforcements 8, 9.

In the first embodiment (FIGS. 1 and 2), this shape enables the front reinforcement 8 to fit more closely to the curvature of the engine hood, thus making it easier to close and reducing assembly clearances.

The reinforcements 8, 9 are generally C-shaped in profile as can be seen in FIGS. 1 and 2. This profile is required firstly by stiffness requirements (in bending, in twisting), and also more generally by the general shape of the front face 1, which shape depends on the vehicle for which the front face 1 is designed.

As mentioned above, the front reinforcement 8 is designed to be joined to the fenders of the vehicle and to be associated with the headlights. Because the cross-member 2 is vertically in register with the front end of the hood (so that it can be fastened thereto), and because the headlights extend behind said front end, it is necessary for the front reinforcement 8 to be C-shaped.

In contrast, the shape of the rear reinforcement 9 can be modified in order to perform one or more additional functions.

Thus, in a third embodiment as shown in FIG. 7, the rear reinforcement 9 is of generally closed profile: it presents a bottom central portion 11' interconnecting the bottom ends of its extensions 13.

As a result, it is possible to integrate a radiator (not shown) within the rear reinforcement 9, the reinforcement defining a housing of suitable shape for forming a protective frame around the radiator.

In addition, this closed shape further increases the stiffness (in bending, in twisting) of the rear reinforcement 9 whose bottom central portion 11' is engaged on a beam (not shown) interconnecting the plates 7 of the equipment front face 1, for example.

In other variant embodiments (not shown), the reinforcements 8, 9 may be of a section other than C-shaped. Thus, the section may be of I-shape or of U-shape (i.e. a channel-section in which the width of the web 17 is less than or equal to the width of the flanges 18, 19).

In yet another embodiment, the reinforcements have central portions that are flat in section and that are positioned on either side of the cross-member body, overlying its top and bottom faces.

As a result, the reinforcements together with the cross-member body form an assembly comprising a metal-plastic-metal sandwich which presents good bending strength.

The reinforcements 8, 9 could equally well be box members of closed section (e.g. square, rectangular, trapezoidal, or more generally of parallelogram shape), thereby increasing the second moment of area thereof and consequently the stiffness thereof (in bending and in twisting).

This provides still greater stability for the front face 1.

Furthermore, a given piece of reinforcement 8, 9 may present different zones presenting different sections so as to combine the respective advantages thereof (stiffness, ease of manufacture, and/or ease of assembly, etc.).

Thus, in the third embodiment shown in FIG. 7, the front reinforcement 8 presents alternating zones 25 of closed section and zones 26 of open section, specifically of channel-section.

What is claimed is:

1. An equipment front face for a motor vehicle, the front face comprising a top cross-member extended at its ends firstly by lateral supports and secondly by legs, the front face comprising at least first and second structural parts each having a central portion and two extensions on either side of the central portion, the central portions of the two structural parts belonging to the cross-member, the extensions of the first structural part belonging to the lateral supports while the extensions of the second structural part belong to the legs, the top cross-member includes a body made of a plastics material interconnecting the structural parts, the structural parts positioned on either side of the cross-member body at the bottom and top faces thereof, each presenting a flat section, whereby the structural parts and the cross-member body together form a sandwich.

2. An equipment front face according to claim 1, in which each of the structural parts presents a C-shaped section.

3. An equipment front face according to claim 2, in which the structural parts are oriented in such a manner that the concave sides of their respective central portions face towards each other.

4. An equipment front face according to claim 2, in which the structural parts are oriented in such a manner that the concave sides of their respective central portions face away from each other.

5. An equipment front face according to claim 4, wherein one of the structural parts is provided with a projecting finger suitable for being received in a facing cavity formed in the other structural part.

6. An equipment front face for a motor vehicle, the front face comprising a top cross-member extended at its ends firstly by lateral supports and secondly by legs, the front face comprising at least first and second structural parts each having a central portion and two extensions on either side of the central portion, the central portions of the two structural parts belonging to the cross-member, the extensions of the first structural part belonging to the lateral supports while the extensions of the second structural part belong to the legs, one of the structural parts is situated towards the front of the cross-member, while the other structural part is situated towards the rear thereof, and the top cross-member includes a body made of a plastics material interconnecting the structural parts.

7. An equipment front face for a motor vehicle, the front face comprising a top cross-member extended at its ends firstly by lateral supports and secondly by legs, the front face comprising at least first and second structural parts each having a central portion and two extensions on either side of the central portion, the central portions of the two structural parts belonging to the cross-member, the extensions of the first structural part belonging to the lateral supports while the extensions of the second structural part belong to the legs, the top cross-member includes a body made of a plastics material interconnecting the structural parts, the structural parts positioned on either side of two opposite sides of the cross-member body, whereby the structural parts and the cross-member body together form a sandwich.

8. The equipment front face of claim 7, wherein the structural parts consist of metal.

9. The equipment front face of claim 7, wherein the cross-member body includes stiffening members suitable for keeping constant the cross-section of the structural parts.

10. The equipment front face of claim 9, wherein the stiffening members comprise a grid of transverse ribs extending in the space defined by each structural part.

11. The equipment front face of claim 7, wherein the structural parts are engaged on the cross-member body.

12. The equipment front face of claim 7, wherein the structural parts are embedded, at least in part, in the cross-member body.

13. The equipment front face of claim 7, wherein the two opposite sides of the cross-member comprise a top side and a bottom side.

14. The equipment front face of claim 7, wherein each structural part includes a flat section.

15. The equipment front face of claim 7, wherein one of the structural parts presents an overall outline that is closed.

16. The equipment front face of claim 7, wherein each of the structural parts presents a C-shaped section.

17. The equipment front face of claim 16, wherein the structural parts are oriented in such a manner that the concave sides of their respective central portions face towards each other.

18. The equipment front face of claim 16, wherein the structural parts are oriented in such a manner that the concave sides of their respective central portions face away from each other.

19. The equipment front face of claim 18, wherein one of the structural parts is provided with a projecting finger suitable for being received in a facing cavity formed in the other structural part.

* * * * *